US007212389B2

(12) United States Patent
Hughes

(10) Patent No.: US 7,212,389 B2
(45) Date of Patent: May 1, 2007

(54) OVER-VOLTAGE PROTECTION SYSTEM

(75) Inventor: David Charles Hughes, Rubicon, WI (US)

(73) Assignee: Cooper Technologies Company, Houston, TX (US)

( * ) Notice: Subject to any disclaimer, the term of this patent is extended or adjusted under 35 U.S.C. 154(b) by 0 days.

(21) Appl. No.: 11/088,863

(22) Filed: Mar. 25, 2005

(65) Prior Publication Data

US 2006/0216992 A1 Sep. 28, 2006

(51) Int. Cl.
*H02H 9/00* (2006.01)

(52) U.S. Cl. ........................................ 361/118; 361/127

(58) Field of Classification Search ................ 361/118, 361/127

See application file for complete search history.

(56) References Cited

U.S. PATENT DOCUMENTS 4,700,258 A * 10/1987 Farmer ........................ 361/39
4,946,393 A 8/1990 Borgstrom .................... 439/88
5,128,824 A * 7/1992 Yaworski et al. ........... 361/127
6,332,785 B1 12/2001 Muench, Jr. et al. ......... 439/88
6,504,103 B1 1/2003 Meyer et al. ............... 174/167
6,744,255 B1 * 6/2004 Steinbrecher et al. ....... 324/511
7,083,450 B1 * 8/2006 Hughes ...................... 439/181

OTHER PUBLICATIONS

"Installation & Operation Instructions 168ALR, Access Port Loadbreak Elbow Connectors"; *Elastimold IS-168ALR* (*Rev C*); pp. 1-5; (Feb. 1, 1994).

"Operating Instructions 200TC-2"; *Elastimold IS-200TC*(*Rev-A*); pp. 1-2; (Feb. 26, 1995).

"Surge Arresters"; *Elastimold Catalog*; pp. 26-27; (2001).

"Surge Arresters, Metal Oxide Varistor Elbow (M.O.V.E.™) Surge Arrester Electrical Apparatus 235-65"; *Cooper Power Systems*; pp. 1-4; Dec. 2003.

"Surge Arresters, Metal Oxide Elbow Surge Arrester Electrical Apparatus 235-65"; *Cooper Power Systems*; pp. 1-4; Jan. 1991.

"Surge Arresters, Metal Oxide Varistor (MOV) Parking Stand Surge Arrester Electrical Apparatus 235-68"; *Cooper Power Systems*; pp. 1-3; Apr. 2002.

"INJPLUG35, 35 kV Amp Loadbreak Injection Plug Operating and Installation Instructions"; *Cooper Power Systems*; p. 1; (Sep. 2002).

"Loadbreak Apparatus Connectors, 200A 15 kV Class Loadbreak Elbow Connector, Electrical Apparatus 500-10"; *Cooper Power Systems*; pp. 1-4; (Feb. 2004).

(Continued)

*Primary Examiner*—Stephen W. Jackson
(74) *Attorney, Agent, or Firm*—Fish & Richardson P.C.

(57) ABSTRACT

An electrical device includes a body, an electrical contact having a first end for electrically coupling to an electrical apparatus and a second end within the body, and a conductor electrically coupled to the second end of the electrical contact. The electrical device also includes an access region defining a cavity and a surge arrester that electrically couples to the conductor through the access region. The cavity provides access to an interior of the electrical device. The access region may include an insulating projection extending from an insulating body of the electrical device and a conductive cover surrounding the insulating projection. The insulating projection defines the cavity. The conductive cover is electrically isolated relative to a conductive shell that surrounds the insulating body.

29 Claims, 12 Drawing Sheets

OTHER PUBLICATIONS

"Loadbreak Apparatus Connectors, 200 A 15 kV and 25 kV Class Elbow Installation Instructions, Service Information S500-10-1"; *Cooper Power Systems*; pp. 1-4; (Feb. 2001).

"Loadbreak Apparatus Connectors, 200 A 15 kV Class Loadbreak Bushing Insert 500-12", *Cooper Power Systems*; pp. 1-2; (Nov. 1995).

"Loadbreak Appartus Connectors, 200 A 15kV Class, Loadbreak Rotatable Feedthru Insert; Electrical Apparatus 500-13"; *Cooper Power Systems*; pp. 1-2; (Apr. 2001).

"Loadbreak Appatus Connectors, 200 A 25kV Class—Expanded Range Loadbreak Elbow Connector, Electrical Apparatus 500-28"; *Cooper Power Systems*; pp. 1-4; (Jan. 2004).

"Loadbreak Appartus Connectors, 200 A 25 kV Class Rotatable Feedthru Insert, Electrial Apparatus 500-30"; *Cooper Power Systems*; pp. 1-2; (Jun. 1999).

"Loadbreak Appartus Connectors, 200 A 35 kV Class Three-Phase Loadbreak Injection Elbow Installation Instructions, Service Information S500-55-2"; *Cooper Power Systems*; pp. 1-6; (Apr. 1999).

* cited by examiner

OVER-VOLTAGE PROTECTION SYSTEM

TECHNICAL FIELD

This description relates to an over-voltage protection system.

BACKGROUND

Electrical transmission and distribution equipment within a distribution system operates at voltages within a fairly narrow range under normal conditions. However, system disturbances, such as lightning strikes and switching surges, may produce momentary or extended voltage levels that greatly exceed the levels experienced by the equipment during normal operating conditions. These voltage variations often are referred to as over-voltage conditions.

If not protected from over-voltage conditions, critical and expensive equipment, such as transformers, switching devices, computer equipment, and electrical machinery, may be damaged or destroyed by over-voltage conditions and associated current surges.

Over-voltage protection electrical devices interconnect sources of energy, such as transformers, switching devices, and circuit breakers, to distribution systems through high voltage conductors.

SUMMARY

In one general aspect, an access region of an electrical device includes an insulating projection extending from an insulating body of the electrical device and a conductive cover surrounding the insulating projection. The insulating projection defines a cavity that provides access to an interior of the electrical device. The conductive cover is electrically isolated relative to a conductive shell that surrounds the insulating body.

Implementations may include one or more of the following features. For example, the conductive cover may be molded from a conductive elastomeric material. The insulating projection may include insulative rubber. The insulating projection may be configured to form an insulative barrier between the conductive cover and the cavity.

The access region may further include a sleeve surrounding the conductive cover. The sleeve may be bonded to the insulating projection or to the insulating body at a junction. The sleeve may be made of an insulative material.

In another general aspect, an electrical device includes a body, an electrical contact having a first end for electrically coupling to an electrical apparatus and a second end within the body, a conductor electrically coupled to the second end of the electrical contact, a projection from the body, and a surge arrester that electrically couples to the conductor through the cavity. The projection defines a cavity that provides access to an interior of the electrical device.

Implementations may include one or more of the following features. For example, the body may be made of an insulative material. The surge arrester may electrically couple to the conductor so as to divert over voltage induced current surges within the conductor around the electrical apparatus.

The electrical device may also include a shell surrounding the body. The shell may be made of a conductive elastomeric material. The body may be made of an insulative material. The projection may be made of an insulative material.

The electrical device may include a projection cover surrounding the projection. The projection cover may be made of a conductive elastomeric material. The projection cover may be integral with a body of the surge arrester. The surge arrester may include a ridge that mates with a recess formed into the projection cover.

The electrical device may include a sleeve surrounding the projection cover. The surge arrester may include a ridge that mates with a recess formed into the sleeve.

The electrical device may include a shell surrounding the body and electrically coupled to the projection cover. Alternatively, the electrical device may include a shell surrounding the body and electrically decoupled from the projection cover.

The surge arrester may include a cup region that fits over the projection. The cup region may include a ridge that mates with a recess formed into the projection.

The surge arrester may include an arrester contact that extends through the cavity and electrically couples with the conductor. The surge arrester may include a contact cover that surrounds at least a portion of the arrester contact. The contact cover may have an outer surface that intimately slides through the cavity. The contact cover may be made of an insulative material. The surge arrester may include a biasing device within the contact cover and surrounding the portion of the arrester contact to bias the arrester contact toward the conductor. The arrester contact may be made of a conductive material.

Aspects of the electrical device can include one or more of the following advantages. The electrical device is formed by re-configuring an existing loadbreak elbow connector to accept an arrester through an access port. Thus, the electrical device provides a modular over-voltage protection system that conserves cabinet space relative to prior over-voltage protection systems used on an apparatus that does not have an open bushing. One prior protection system used on such an apparatus requires the placement of a bushing surge arrester between the bushing well of the closed bushing and the loadbreak elbow connector. Another prior protection system used on such an apparatus requires the placement of a loadbreak feed-thru insert between the bushing well of the closed bushing and the loadbreak elbow connector, and the addition of an elbow surge arrester that attaches to the loadbreak feed-thru insert.

Furthermore, the access region of an electrical device is re-configured to reduce the effects of contamination in the electrical device and to improve dielectric strength of the electrical device access port. Moreover, the re-configured access region permits a test tool to be inserted into the electrical device to energize the cover of the access region without having a line-to-ground fault to the grounded shell of the electrical device.

Other features will be apparent from the description, the drawings, and the claims.

DESCRIPTION OF DRAWINGS

Like reference symbols in the various drawings may indicate like elements.

DETAILED DESCRIPTION

Figure 1:
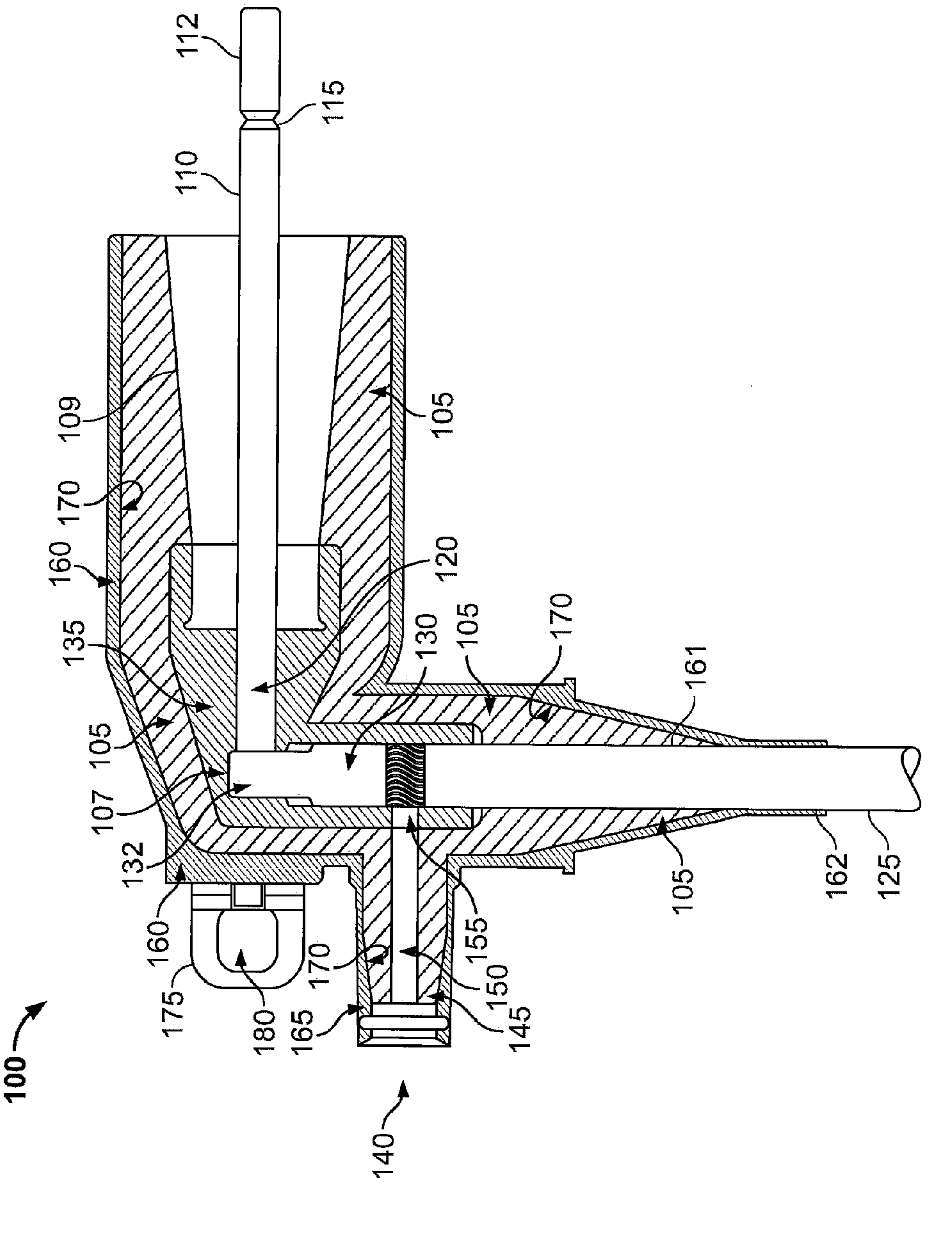
FIG. 1 is a side cross sectional view of an electrical device.

Referring to FIG. 1, an electrical device 100 includes a body 105 that houses a coupling assembly 107, and an electrical contact 110 having a first end 115 for electrically coupling to an electrical apparatus (such as, for example, a source of energy such as a transformer or a circuit breaker) and a second end 120 within the coupling assembly 107 of the body 105. The electrical device 100 may be any device that provides over-voltage protection such as a separable insulated connector, a loadbreak device, or a loadbreak injection device. The electrical contact 110 also includes an arc follower 112 protruding from the first end 115. The arc follower 112 is made of an insulating plastic material and is configured to mate with an arc snuffer of a bushing on the electrical apparatus.

The electrical device 100 also includes a conductor 125 electrically coupled to the second end 120 of the electrical contact 110 at a connector 130 housed within the coupling assembly 107. The conductor 125 is coupled to a distribution system.

The connector 130 is a crimp-type or compressive connector that couples the conductive strands of the conductor 125 to the second end 120 of the electrical contact 110. The second end 120 of the electrical contact 110 is threaded into a threaded portion 132 of the connector 130. The first end 115 is configured to mate with a female connector device of an associated bushing of the electrical apparatus, thus allowing easy connection and disconnection of the electrical device 100 to energize and de-energize the conductor 125.

The electrical device 100 also includes a semiconductive insert such as a faraday cage 135, which has the same electric potential as the conductor 125 and the electrical contact 110 and which surrounds the coupling assembly 107. The faraday cage 135 prevents corona discharges within the coupling assembly 107. So configured, the electrical device 100, through the coupling assembly 107, may be disconnected from the electrical apparatus to create a break in the circuit.

The electrical device 100 also includes an external conductive shell 160 surrounding the body 105. The external conductive shell 160 may be molded from a conductive elastomeric material, such as, for example, a terpolymer elastomer made from ethylene-propylene diene monomers loaded with carbon, and/or other conductive materials. One example of a conductive material is ethylene propylene terpolymer (EPT) loaded with carbon or ethylene propylene diene monomer (EPDM) loaded with carbon. The conductive shell 160 may be pre-molded in the shape of an elbow to include a conductor opening 162 for receiving the conductor 125.

The body 105 is made from an insulative material such as, for example, EPDM. The body 105 occupies the space between the coupling assembly 107 and the conductive shell 160. In this way, the body 105 forms a dielectric and electrically insulative barrier between the high voltage components and the conductive shell 160. The body 105 also includes an opening 161 for receiving the conductor 125 and an opening 109 for receiving the electrical apparatus and for housing the contact 110.

The electrical device 100 includes a pull device 175 coupled to the conductive shell 160 and defining an eye 180, and a stick (not shown) that is shaped to lock with the eye 180 of the pull device 175. When the stick is locked to the pull device 175, the operator manipulates the stick to withdraw the electrical device 100 from the bushing of the electrical apparatus during a loadbreak operation. This permits the operator to manipulate the device 100 from a safe distance.

It is often desirable to gain access to an interior 155 of the electrical device 100. To enable this access, the electrical device 100 includes an access port 140. The access port 140 includes a projection 145 extending from the body 105. The projection 145 defines a cavity 150 that provides access to the interior 155 of the electrical device 100. The projection 145 is made of an insulative material. The cavity 150 is a straight hole extending from an exterior of the electrical device 100 through the projection 145 and into the body 105 such that at least a portion of the high voltage items within the electrical device 100 is exposed at the interior 155. The projection 145 is covered with a conductive shield 165, such as a premolded conductive boot.

During manufacture, the conductive shield 165 may be formed integrally with the conductive shell 160 by one molding process such that they are integral and one piece, or they may each be formed separately and then permanently attached to each other by welding, gluing, or other means by which the two are electrically coupled to each other. Either way, the conductive shield 165 is fixedly or permanently secured to the conductive shell 160 such that it is not readily removable or detachable.

After the conductive shield 165 is in the proper location, the conductive shell 160 and the conductive shield 165 are filled with an insulative material that forms the body 105 and the projection 145. The projection 145 may be formed in a separate step, or the projection 145 and the body 105 may be formed in one step such that they are one piece or integral with each other. Likewise, the projection 145 and the body 105 may be formed from different insulative materials or the same material.

During use, the conductive shell 160 and the conductive shield 165 may be electrically connected to ground such that they dissipate surface voltage on an external surface 170 of the body 105 and the projection 145. A discussion of the properties of the materials used for the body 105 and the projection 145 is found in U.S. Pat. No. 6,332,785, which is incorporated herein by reference in its entirety.

Figure 2:
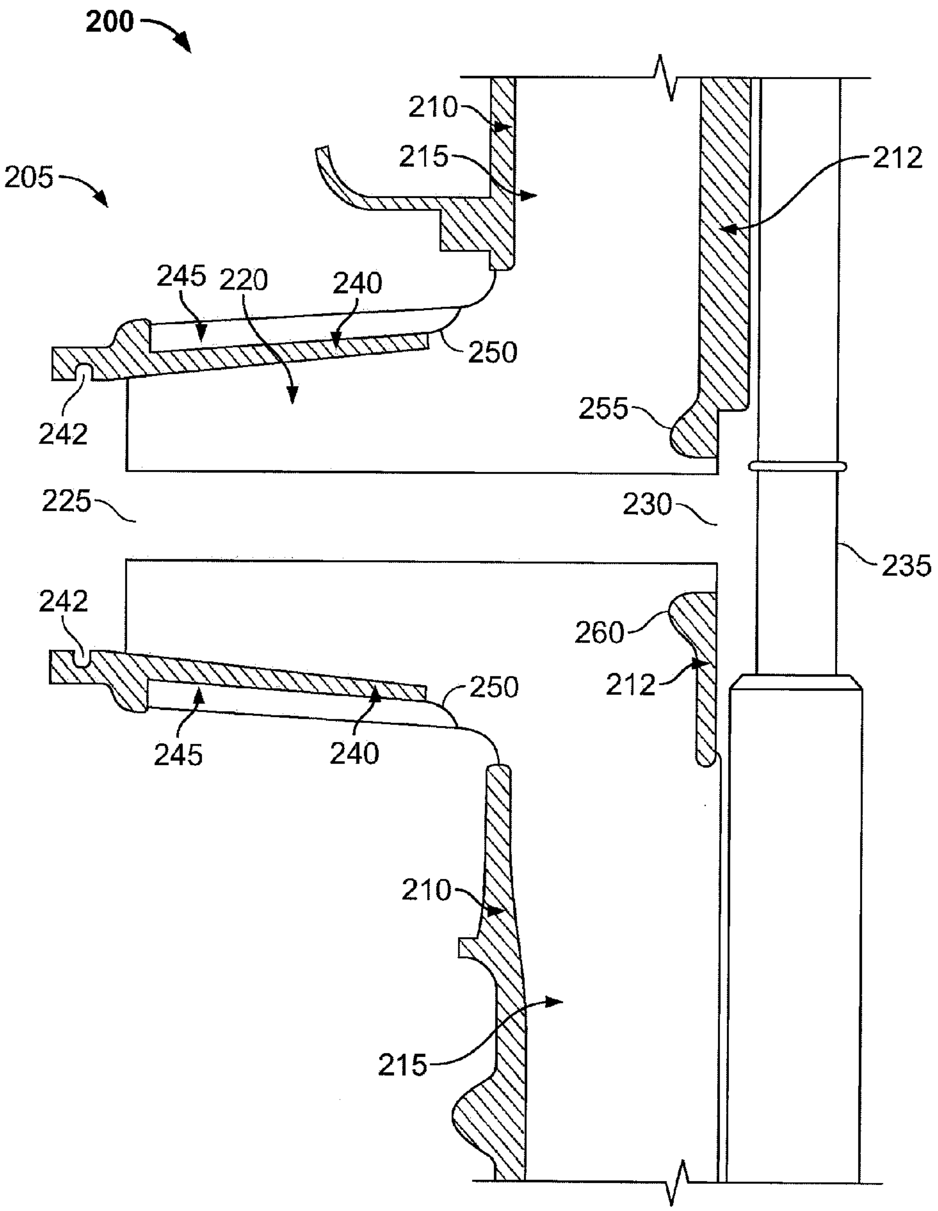
FIG. 2 is a side cross sectional view of an injection port of an electrical device.
Figure 3:
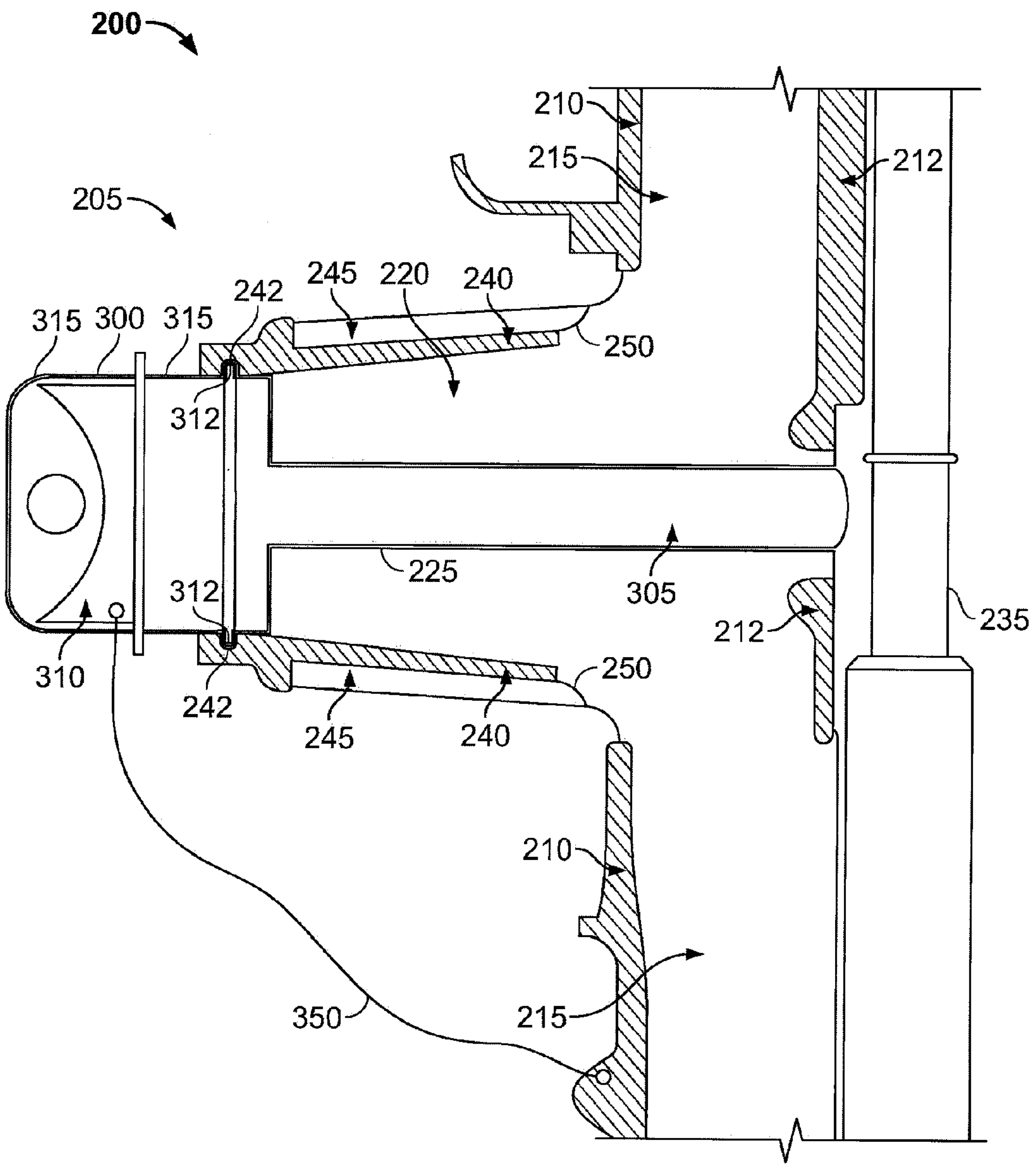
FIG. 3 is a side cross sectional view of a plug inserted into the injection port of the electrical device of FIG. 4.

FIGS. 2 and 3 describe a design for a re-configured access region of an over-voltage protection electrical device. FIGS. 4–10 describe a design for an over-voltage protection electrical device that is re-configured to accept an arrester. The electrical device that has been re-configured to accept an arrester may include the re-configured design of the access region shown in FIGS. 2 and 3. In this case, the arrester would look like the arrester shown in FIG. 6. On the other hand, the electrical device that has been re-configured to accept an arrester (as shown in FIGS. 4–10) may include the design of the access port 140 discussed above, the design of the access regions shown in FIGS. 4–10, or any suitable design that will accept the arrester.

Referring also to FIG. 2, an electrical device (a portion 200 of which is shown) is designed much like the electrical device 100 shown in FIG. 1 except for the design of an access region 205. The electrical device includes an external conductive shell 210 surrounding a body 215. Note that while the shell 210 appears to be formed of more than one piece, the shell 210 is actually formed of a single piece, in a similar manner to the shell 160 of FIG. 1. As discussed above, the external conductive shell 210 may be molded from a conductive elastomeric material, such as, for example, a conductive rubber or a terpolymer elastomer made from EPDM or EPT loaded with carbon or other conductive materials. As also discussed above, the body 215 is made from an insulative material such as, for example, EPDM or insulative rubber. The electrical device also includes a semiconductive insert such as a faraday cage 212, which surrounds the coupling assembly that houses the connector and electrical contact at the region where they mate.

The access region 205 includes a projection 220 extending from the body 215. The projection 220 is made of an insulative material such as insulative rubber. The projection 220 defines a cavity 225 that provides access to an interior 230 of the electrical device. The cavity 225 is a straight hole extending from an exterior of the electrical device through the projection 220 and into the body 215 such that at least a portion of the high voltage items within the electrical device is exposed at the interior 230. Thus, a conductor 235 is exposed at the interior 230 of the electrical device.

The projection 220 is covered with a cover 240. The cover 240 may be molded from a conductive elastomeric material such as a conductive rubber or a terpolymer elastomer made from EPDM or EPT loaded with carbon or other conductive materials. The cover 240 includes a groove 242 formed around an inner perimeter of the cover 240 that is not adjacent the projection 220. The projection 220 forms a dielectric and electrically insulative barrier between the cover 240 and the cavity 225.

The access region 205 also includes a sleeve 245 surrounding the cover 240 and bonded to the body 215 or to the projection 220 at a junction 250. The sleeve 245 is made of insulative material, such as, for example insulative rubber or plastic. The sleeve 245 may be flexible or rigid.

Referring also to FIG. 3, when the access region 205 is not in use, an insert plug 300 may be inserted into the cavity 225 to dielectrically seal the access cavity 225 and complete the grounded external shield surrounding the body 215. The insert plug 300 includes a shaft 305 and a head 310 attached to the shaft 305. The shaft 305 and the head 310 are made of an insulative material such as non-conductive plastic.

The shaft 305 is sized to be matingly received by the cavity 225 and the head 310 is shaped to mate with the cover 240 using an interference fit. For example, the head 310 includes a ridge 312 that surrounds the perimeter of the head 310. The ridge 312 is sized to fit within the groove 242 of the cover 240 to establish the interference fit when the plug 300 is inserted into the cavity 225, as shown in FIG. 3. Other configurations for mating the head 310 with the cover 240 include mechanical threads, a screw, a pin, a snap, a wire, a latch, a hook, a buckle, or an adhesive. In this way, the cavity 225 is sealed to prevent materials from entering or exiting the interior of the electrical device 200 and the continuity of the dielectric projection 220 is restored.

The head 310 may also include a layer 315 of conductive material or a conductive coating bonded to its exterior surface. That is, the conductive material is fixedly adhered to the exterior surface of the head 310 such that the conductive material is intended to remain on the exterior surface indefinitely and is not readily removable. The conductive material may be sprayed on the exterior surface of the head 310 or deposited by any suitable process, such as, for example, painting or metalizing. When the plug 300 is inserted into the cavity 225, the conductive coating is electrically coupled to the cover 240 at the interface near and between the ridge 312 and the groove 242 such that the conductive coating is at ground potential when the cover 240 is at ground potential. If the cover 240 and the conductive coating are at ground potential, any surface voltage that may develop on the exterior surface of the projection 220 due to capacitive coupling and any corona discharges arcing to the conductive coating are dissipated to ground.

The sleeve 245 prevents any contamination (such as dirt, water, or conductive materials) that may have accumulated at the cover 240 from continuing to the shell 210 by blocking the path from the cover 240 to the shell 210. Additionally, the sleeve 245 extends the strike distance between the shell 210 and the cover 240. Thus, a conductive rod (or a test tool) inserted through the cavity 225 may energize the cover 240 without having a line-to-ground fault to the grounded shell 210.

As shown, the cover 240 is electrically isolated relative to the conductive shell 210 that surrounds the body 215. That is, the cover 240 is not electrically coupled to the conductive shell 210. Such a design ensures that the conductive shell 210 (which is grounded), is farther away from the faraday cage 212 and conductor 235, which are the energized parts of the access region 205. If the cover 240 were electrically coupled to the conductive shell 210 and therefore at ground potential, then the electrical stress within the cavity 225 and the interior 230 would be higher and there would be a greater chance of electrical arcing from the interior 230 to the grounded cover 240 along the length of the cavity 225.

Moreover, the shell 210 is further receded relative to the access region 205, thus reducing stress at the tip of the shaft 305 when the plug 300 is inserted into the cavity 225 or in the region of the body 215 near the access region 205. The visible break between the shell 210 and the cover 240 provides a visual cue to the operator that the cover 240 is electrically isolated relative to the shell 210 when the plug 300 is removed.

The cover 240 is not isolated when the plug 300 is fully inserted into the cavity 225. Rather, the cover 240 is electrically connected to ground through a wire 350 connecting the head 310 of the plug 300 (which is electrically coupled to the cover 240 through the conductive material layer) with the shell 210, which is grounded.

Additionally, the shape of the cage 212 is modified at regions 255 and 260. The regions 255 and 260 are near the interior of the electrical device and at least one of the regions 255 and 260 is formed with a thickness that is greater than an average thickness of the cage 212. Both of the regions 255 and 260 are formed with a shape that provides additional structural support to the region of the body 215 near the access region 205 and further reduces stress at the tip of the shaft 305 when the plug 300 is inserted into the cavity 225.

Figure 4:
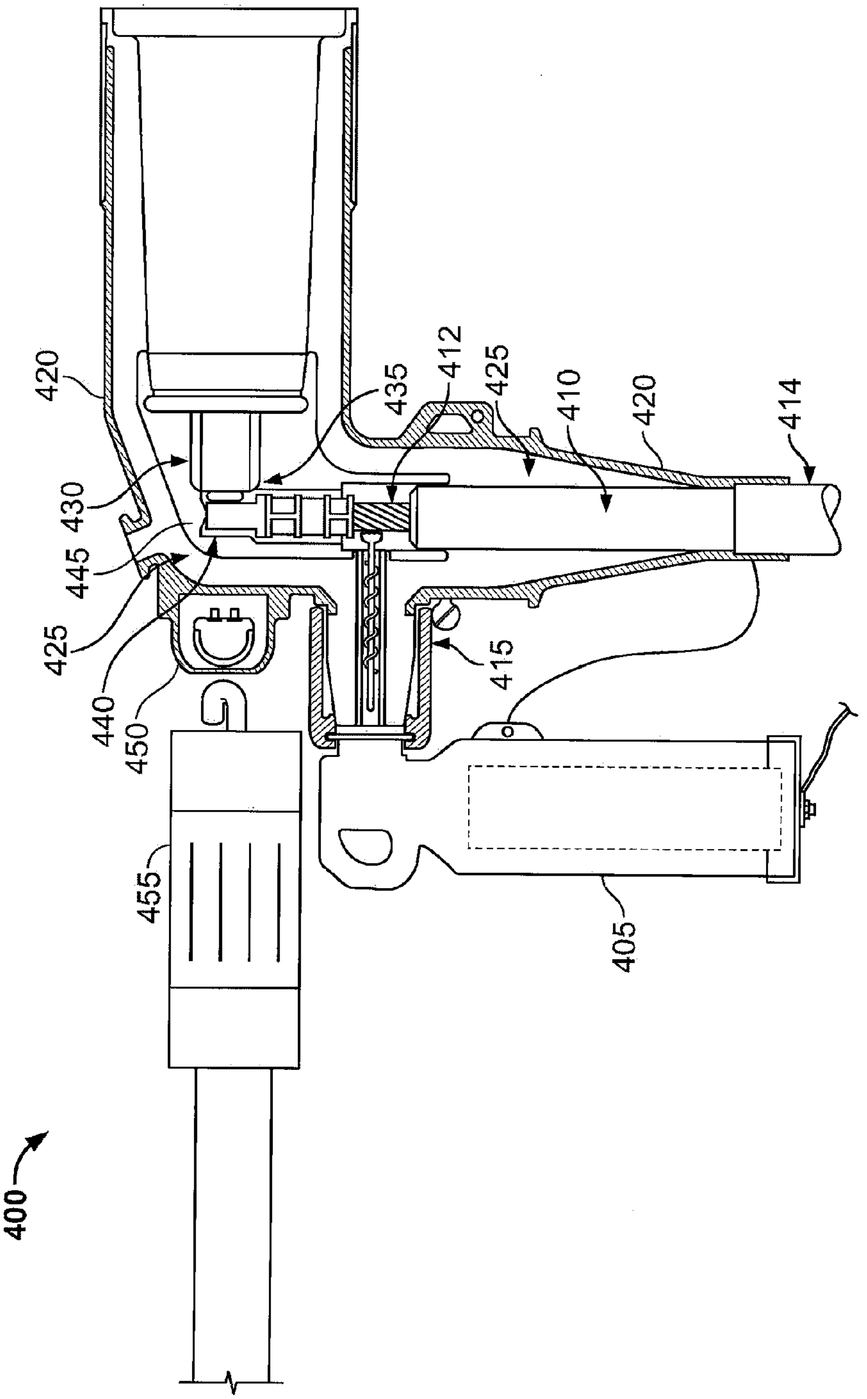
FIG. 4 is a partial side cross sectional view of an electrical device including an arrester shown in side plan view.

Referring also to FIG. 4, an electrical device 400 includes a surge arrester 405 that electrically couples to a conductor 410 through an access region 415. The electrical device 400 is designed much like the electrical device 100 of FIG. 1 except that the access region 415 is re-configured to accept an arrester.

Like the electrical device 100 described above, the electrical device 400 includes an external conductive shell 420 surrounding a body 425. The body 425 houses a coupling assembly 430, and an electrical contact (not shown in FIG. 4, but represented by the contact 110 in FIG. 1) having a first end for electrically coupling to an electrical apparatus (such as, for example, a source of energy such as a transformer or a circuit breaker) and a second end within the coupling assembly 430 of the body 425. At one end 412, the conductor 410 is electrically coupled to the second end of the electrical contact at a connector 435 housed within the coupling assembly 430, and at another end 414, the conductor 410 is coupled to a distribution system.

The surge arrester 405 protects the electrical apparatus from dangerous over-voltage conditions. The surge arrester 405 is connected through the access region 415 to the conductor 410 so as to shunt or divert over-voltage-induced current surges within the conductor 410 safely around the electrical apparatus, thereby protecting the electrical apparatus and its internal circuitry from damage. Details about the arrester 405 are discussed below with respect to FIGS. 5 and 6.

As discussed above, the external conductive shell 420 may be molded from a conductive elastomeric material, such as, for example, a conductive rubber or a terpolymer elastomer made from EPT or EPDM loaded with carbon or other conductive materials. As also discussed above, the body 425 is made from an insulative material such as, for example, EPDM or insulative rubber.

The connector 435 is a crimp-type or a compressive connector that couples the conductive strands of the conductor 410 to the second end of the electrical contact. The second end of the electrical contact is threaded into a threaded portion 440 of the connector 435. The first end of the electrical contact is configured to mate with a female connector device of an associated bushing of the electrical apparatus, thus allowing easy connection and disconnection of the electrical device 400 to energize and de-energize the conductor 410.

The electrical device 400 may also include a semiconductive insert such as a faraday cage 445, which has the same electric potential as the conductor 410 and the electrical contact, and which surrounds the coupling assembly 430. The faraday cage 445 prevents corona discharges within the coupling assembly 430. So configured, the electrical device 400, through the coupling assembly 430, may be disconnected from the electrical apparatus to create a break in the circuit.

The electrical device 400 also includes a pull device 450 coupled to the conductive shell 420 and a stick 455 that is shaped to lock with the pull device 450. The stick 455 is locked to the pull device 450 and then manipulated to withdraw the electrical device 400 from the bushing of the electrical apparatus during a loadbreak operation. This permits the operator to manipulate the device 400 from a safe distance.

Figure 5:
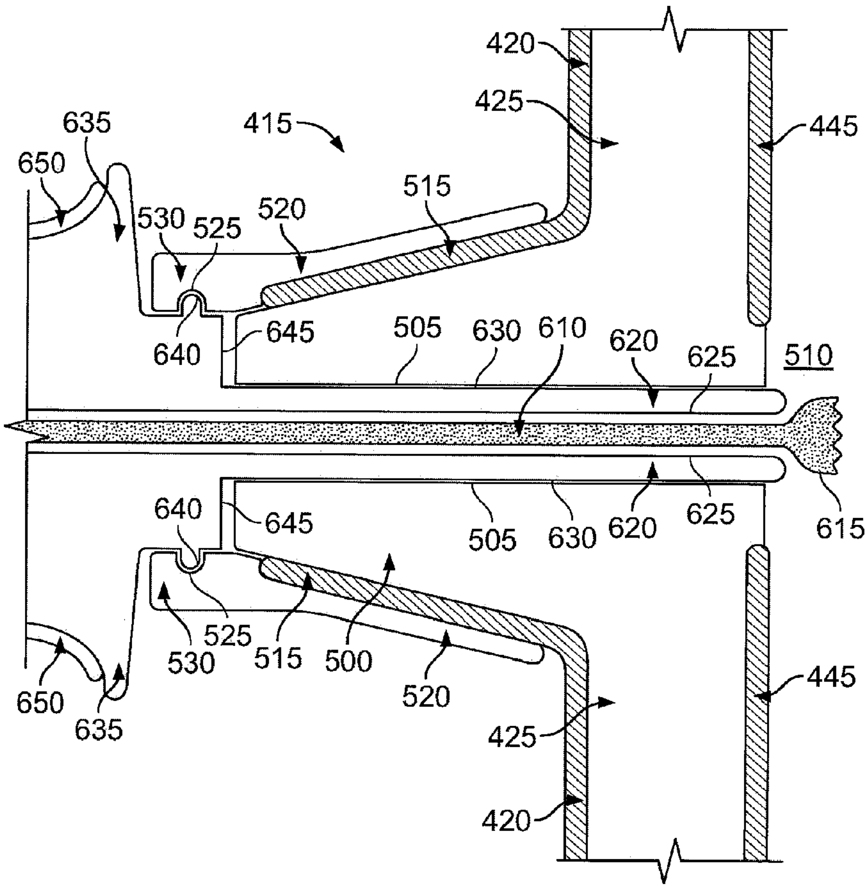
FIG. 5 is a side cross sectional view of an insertion portion of an arrester inserted into an injection port of the electrical device of FIG. 4.

Referring also to FIG. 5, the access region 415 includes a projection 500 extending from the body 425. The projection 500 defines a cavity 505 that provides access to an interior 510 of the electrical device 400. The cavity 505 is a straight hole extending from an exterior of the electrical device 400 through the projection 500 and into the body 425 such that at least a portion of the high voltage items within the electrical device 400 and in particular, the conductor 410 is exposed at least at the interior 510.

The projection 500 is covered with a cover 515. The cover 515 may be molded from a conductive elastomeric material such as a conductive rubber or a terpolymer elastomer made from EPDM or EPT loaded with carbon or other conductive materials. As shown, the cover 515 is coupled to the conductive shell 420 that surrounds the body 425. The projection 500 is made of an insulative material such as insulative rubber or plastic. The projection 500 forms a dielectric and electrically insulative barrier between the cover 515 and the cavity 505.

The access region 415 also includes a sleeve 520 surrounding the cover 515. The sleeve 520 is made of insulative material, such as, for example insulative rubber or plastic. The sleeve 520 may be flexible or rigid. The sleeve 520 is generally cylindrical to cover at least a portion of the cover 515. The sleeve 520 also includes a recess 525 embedded within an extension 530 of the sleeve 520.

Figure 6:
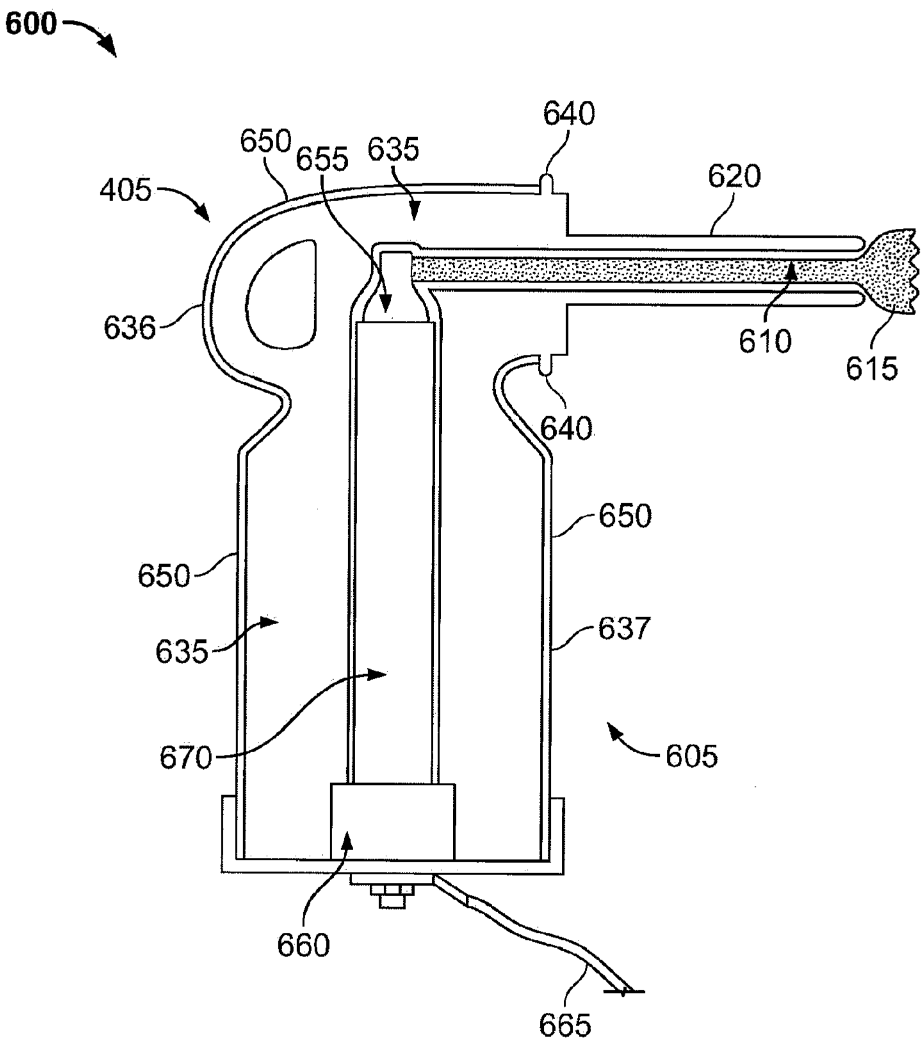
FIG. 6 is a side cross sectional view of the arrester of FIG. 5.

Referring also to FIG. 6, the arrester 405 includes an insertion portion 600 configured to be inserted into the cavity 505 of the electrical device 400 and a base 605 that houses the remaining arrester components, as discussed below. The insertion portion 600 includes an arrester contact 610 having a region 615 that extends into the interior 510 and electrically contacts the conductor 410 when the arrester 405 is attached to the electrical device 400. The region 615 can have a circular cross section when viewed along the axis of the arrester contact 610. In other implementations, the region 615 has a polygonal shape or an irregular shape. The outer surface of the region 615 has a knurled surface (or any suitably roughened surface) to obtain an improved electrical contact with the conductor 410.

The arrester contact 610 is made of any suitably conductive metal. The arrester 405 also includes a contact cover 620 that surrounds the contact 610 to provide additional structural support to the insertion portion 600 and to provide an insulating barrier between the contact 610 and the projection 500. The contact cover 620 includes an inner region 625 sized to intimately mate with the contact 610. The contact cover 620 also includes an outer surface 630 sized to be inserted into the cavity 505 while still maintaining an intimate fit with the wall of the projection 500 forming the cavity 505. The contact cover 620 is made of an insulative material such as insulative rubber or plastic.

The base 605 includes an arrester body 635 to which the contact cover 620 is attached. The arrester body 635 may be formed integrally with the cover 620 using a molding technique. Alternatively, the arrester body 635 and the cover 620 may be separately formed and then mated using any suitable mating technique during assembly. The arrester body 635 is made of an electrically insulative material such as insulative rubber or plastic.

The arrester body 635 is formed with a ridge 640 that mates with the recess 525 of the sleeve 520 and a wall 645 that abuts the projection 500 when the arrester 405 is attached to the electrical device 400. The ridge 640 and the recess 525 are cylindrical such that the arrester 405 can be rotated relative to the access region 415 about an axis extending along the contact 610. Because of this design, the arrester 525 can be arranged or rotated to vent gases in a suitably safe direction during a failure.

The arrester body 635 is surrounded by a layer 650 of conductive material or a conductive coating bonded to its exterior surface. That is, the conductive material is fixedly adhered to the exterior surface of the body 635 such that it is intended to remain on the exterior surface indefinitely and is not readily removable. The conductive material may be sprayed on the exterior surface of the body 635 or deposited by any suitable process, such as, for example, painting or metalizing.

The arrester body 635 includes a pull device 636 positioned opposite the insertion portion 600 and an elongated enclosure 637 extending from the insertion portion 600. The elongated enclosure 637 houses the electronics of the arrester 405. In particular, as shown in FIG. 6, the arrester body 635 houses a terminal 655 electrically connected to the contact 610, a terminal 660 electrically connected a ground potential through a ground lead 665, and an array 670 of other electrical components that form a series electrical path between the terminals 655 and 660.

The components within the array 670 typically include a stack of electrical elements. The electrical elements may be voltage-dependent, nonlinear resistive elements, referred to as varistors. A varistor is characterized by having a relatively high impedance when exposed to a normal system frequency voltage, and a much lower resistance when exposed to a larger voltage, such as is associated with over-voltage conditions. The varistors may be metal oxide varistors (MOVs). Each MOV is made of a metal oxide ceramic formed into a short cylindrical disk having an upper face, a lower face, and an outer cylindrical surface. The metal oxide used in the MOV may be of the same material used for any high energy, high voltage MOV disk, such as a formulation of zinc oxide.

In use, the arrester 405 is inserted into the electrical device 400 by inserting the insertion portion 600 into the cavity 505. The ridge 640 mates with the recess 525 of the sleeve 520 and the wall 645 abuts the projection 500 when the arrester 405 is completely inserted into the electrical device 400. The arrester 405 can then be rotated relative to the access region 415 about the axis extending along the contact 610 to ensure proper venting of gases.

When exposed to an over-voltage condition, the surge arrester 405 operates in a low impedance mode that provides a relatively low impedance current path to electrical ground through the ground lead 665. When the surge arrester 405 is operating in low impedance mode, the impedance of the current path is substantially lower than the impedance of the electrical apparatus being protected by the surge arrester 405.

When the over-voltage condition has passed, the surge arrester 405 returns to operation in a high impedance mode that provides a relatively high impedance current path to electrical ground through the ground lead 665. When the surge arrester 405 is operating in the high impedance mode, the impedance of the current path is higher than the impedance of the protected electrical apparatus. The high impedance mode prevents normal current at the system frequency from flowing through the surge arrester 405 to ground.

The arrester 405 may be left in place during a loadbreak operation in which the electrical device 400 is disconnected from the electrical apparatus such that the current to the conductor 410 from the electrical device 400 is disconnected from the conductor 410. The arrester 405 may be easily moved from one electrical device to another electrical device using the pull device 636 so as to move the open point on a loop system that includes the electrical devices.

When the arrester 405 is to be removed from the electrical device 400, the operator pulls the arrester 405 out of the electrical device 400 by grasping the pull device 636 with a stick or any suitable device.

Although the access cavity is shown as a straight cylindrical hole, other shapes are contemplated. For example, the access cavity may be inclined with respect to the conductive shell. The access cavity may be conical, square, triangular, oval, polygonal, or of other configurations, as long as the interior of the electrical device is exposed.

Although the body and the projection may be formed from dielectric materials and are intended to block electric current, it is common for the external surface of the body and the projection to develop a high voltage due to capacitive coupling. Thus, dielectric materials that may be used for the body, the projection, or both the body and the projection are those materials that are electrical insulators or in which an electric field can be sustained with a minimum dissipation of power. In general, a solid material is suitably dielectric if its valence band is full and it is separated from its conduction band by at least 3 eV. Dielectric materials from which the electrical device body or projection may be formed include, for example, EPDM.

In addition to varistors, the surge arrester 405 also may include one or more spark gap assemblies electrically connected in series or parallel with one or more of the varistors. The arrester 405 may include electrically conductive spacer elements coaxially aligned with the varistors and gap assemblies. The arrester 405 may include a shield surrounding the stack and separating the stack from the arrester body 635.

The electrical elements of the array 670 may be varistors, capacitors, thyristors, thermistors, resistors, terminals, spacers, or gap assemblies. The array 670 may be formed with any different numbers of elements, and elements of different sizes or types.

Figure 7:
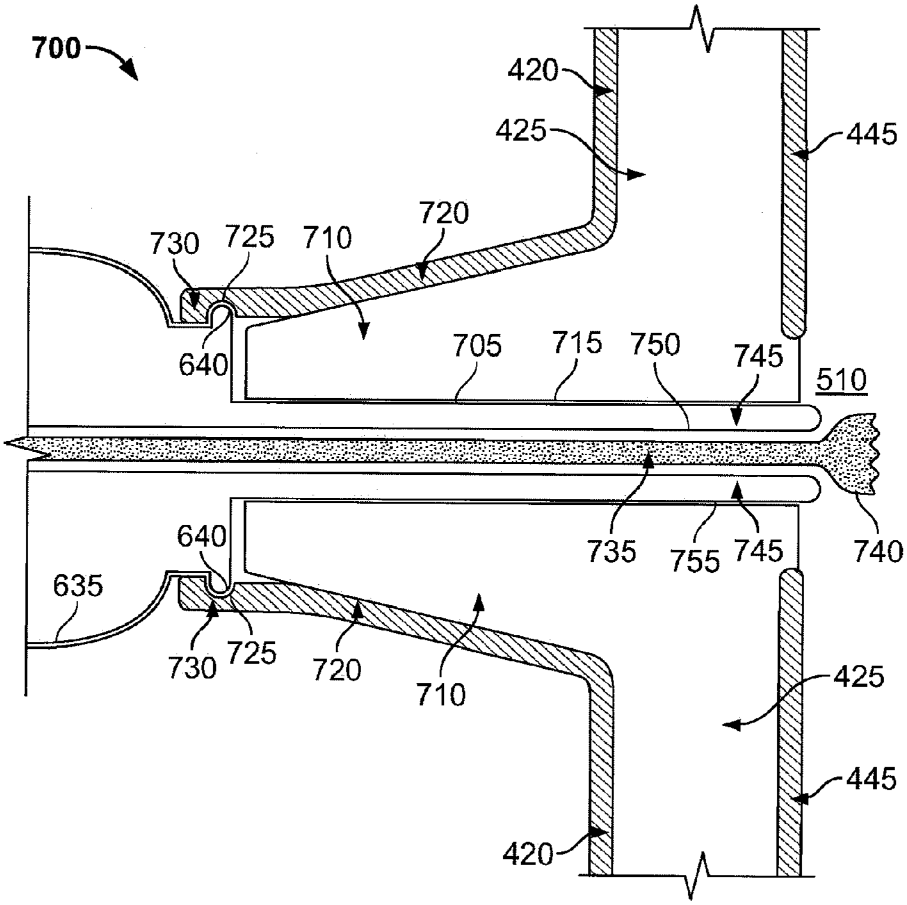
FIG. 7 is a side cross sectional view of an insertion portion of an arrester inserted into an injection port of the electrical device of FIG. 4.

Referring to FIG. 7, in another implementation, the electrical device 400 is designed with an access region 700 that is configured to accept the surge arrester 405 and the surge arrester 405 is designed with an insertion portion 705 that is inserted into the access region 700. Unlike the access region 415, the access region 700 lacks a sleeve and it's cover 720 extends further over a projection 710 that extends from the body 425, as detailed below.

The projection 710 defines a cavity 715 that provides access to the interior 510 of the electrical device 400. The projection 710 is made of an insulative material such as insulative rubber or plastic. The projection 710 is covered with the cover 720. The cover 720 may be molded from a conductive elastomeric material such as a conductive rubber or a terpolymer elastomer made from ethylene-propylene diene monomer loaded with carbon or other conductive materials. As shown, the cover 720 is coupled to the conductive shell 420 that surrounds the body 425. The cover 720 also includes a recess 725 embedded within an extension 730 of the cover 720.

The insertion portion 705 includes an arrester contact 735 having a region 740 that extends into the interior 510 and electrically contacts the conductor 410 when the arrester 405 is attached to the electrical device 400. The arrester contact 735 is made of any suitably conductive metal. The arrester 405 also includes a contact cover 745 that surrounds the contact 735 to provide additional structural support to the insertion portion 705 and to provide an insulating barrier between the contact 735 and the projection 710. The contact cover 745 includes an inner region 750 sized to intimately mate with the contact 735. The contact cover 745 also includes an outer surface 755 sized to be inserted into the cavity 715 while still maintaining an intimate fit with the wall of the projection 710 forming the cavity 715. The contact cover 745 is made of an insulative material such as insulative rubber or plastic.

The contact cover 745 is attached to the arrester body 635, as discussed above. As shown, the ridge 640 of the arrester body 635 mates with the recess 725 of the cover 720. The ridge 640 and the recess 725 are cylindrical such that the arrester 405 can be rotated relative to the access region 700 about an axis extending along the contact 735. Because of this design, the arrester can be arranged or rotated to vent gases in a suitably safe direction during a failure.

Figure 8A:
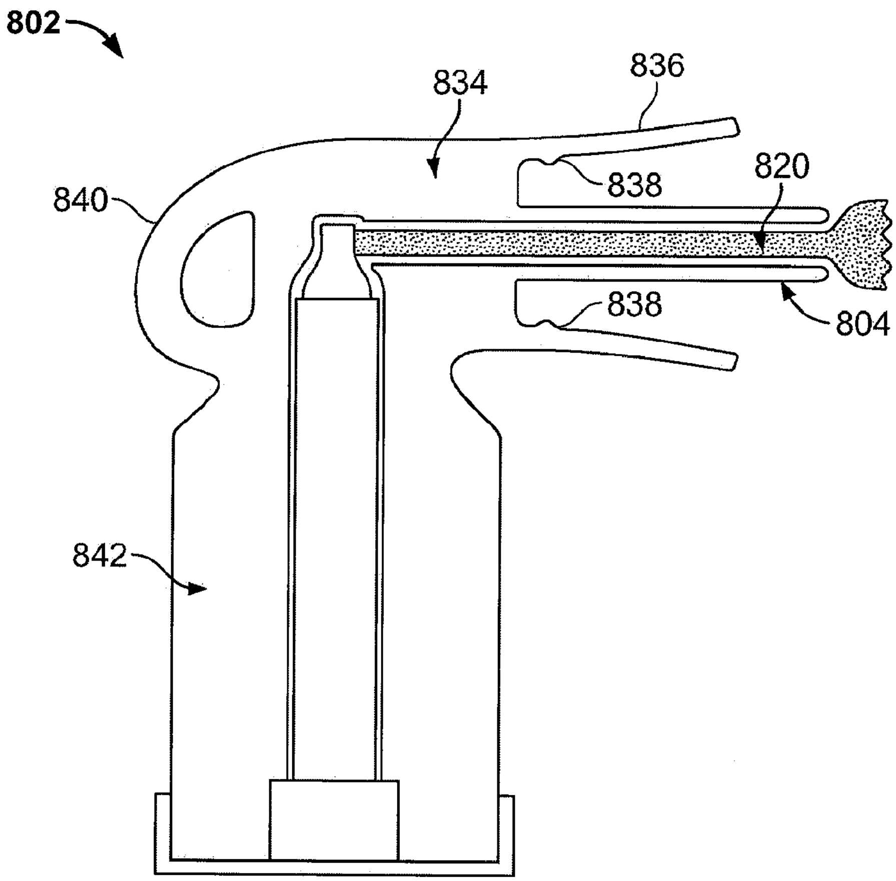
FIG. 8A is a side cross sectional view of an arrester for insertion into an injection port of an electrical device.
Figure 8B:
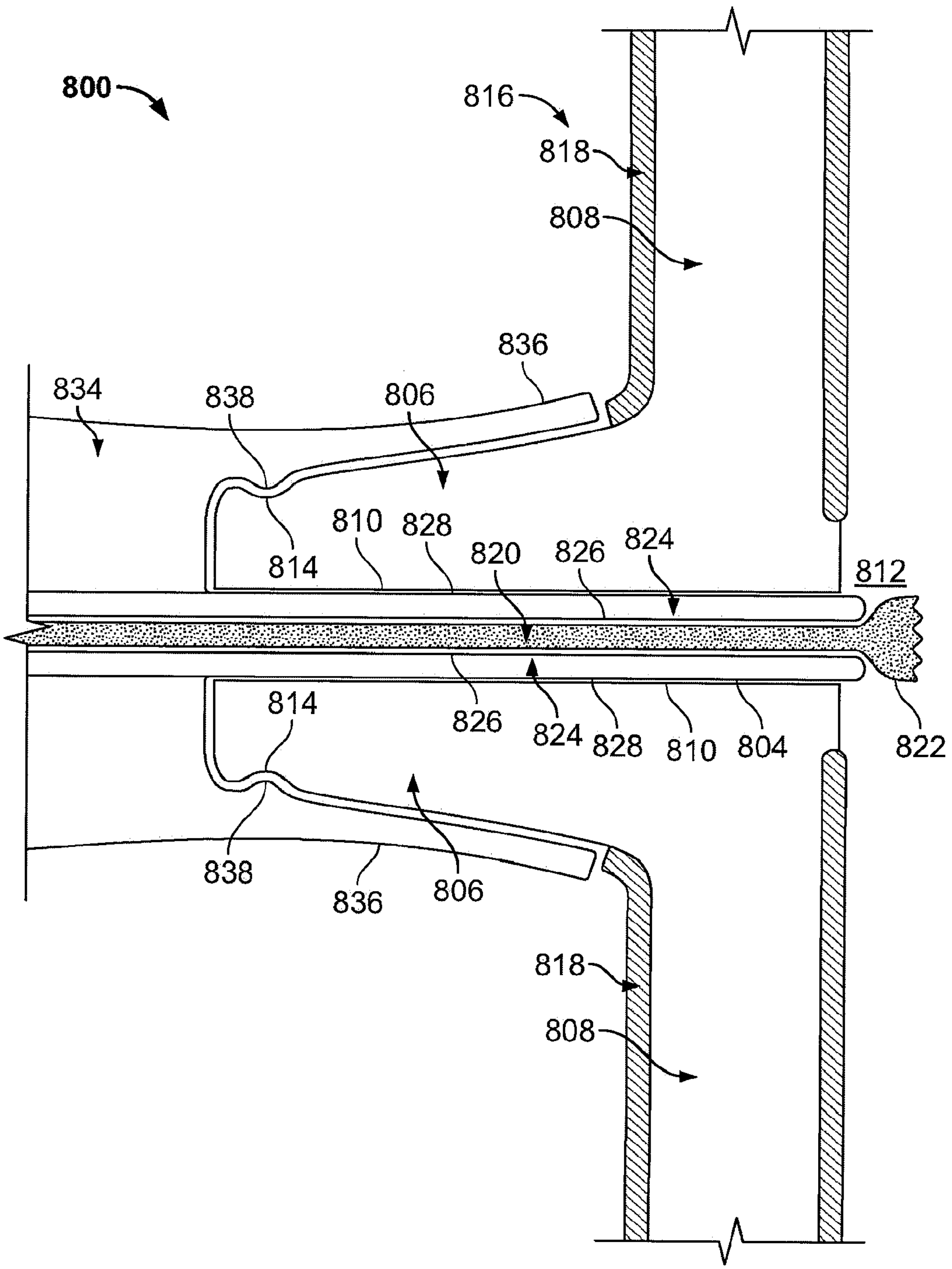
FIG. 8B is a side cross sectional view of an insertion portion of the arrester of FIG. 8A inserted into an injection port of an electrical device.

Referring to FIGS. 8A and 8B, in another implementation, an electrical device is designed with an access region 800 and a surge arrester 802 is designed with an insertion portion 804 that is configured to be inserted into the access region 800. Unlike the access region 415, the access region 800 lacks a sleeve and a cover. Unlike the insertion portion 600, the insertion portion 804 includes a cup region 836 extending from a body 834 of the arrester 802 and designed to cover the projection of the access region 800 when the arrester 802 is connected to the electrical device, as detailed below.

The access region 800 includes a projection 806 that extends from a body 808 of the electrical device. The projection 806 defines a cavity 810 that provides access to an interior 812 of the electrical device. The projection 806 also includes a recess 814 formed along an outer surface of the projection 806. The projection 805 is made of an insulative material such as insulative rubber or plastic.

The electrical device includes a region 816 that is reconfigured to accommodate the design of the access region 800. In particular, the region 816 includes an external conductive shell 818 surrounding the body 808. Unlike the conductive shell 420, the conductive shell 818 does not extend over the projection 806. Therefore, the projection 806 is exposed if the arrester 802 is not attached to the electrical device.

The insertion portion 804 includes an arrester contact 820 having a region 822 that extends into the interior 812 and electrically contacts the conductor 410 when the arrester 802 is attached to the electrical device. The arrester contact 820 is made of any suitably conductive metal. The arrester 802 also includes a contact cover 824 that surrounds the contact 820 to provide additional structural support to the insertion portion 804 and to provide an insulating barrier between the contact 820 and the projection 806. The contact cover 824 includes an inner region 826 sized to intimately mate with the contact 820. The contact cover 824 also includes an outer surface 828 sized to be inserted into the cavity 810 while still maintaining an intimate fit with the wall of the projection 806 forming the cavity 810. The contact cover 824 is made of an insulative material such as insulative rubber or plastic.

The contact cover 824 is attached to the arrester body 834 of the arrester 802. The arrester body 834 is formed of an insulative material such as insulative rubber. The arrester body 834 includes the cup region 836, which has a ridge 838 that is formed on an inner surface of the cup region 836 such that the ridge 838 mates with the recess 814 of the projection 806 and the cup region 836 fits over the projection 806 when the arrester 802 is attached to the electrical device. The ridge 838 and the recess 806 are cylindrical such that the arrester 802 can be rotated relative to the access region 800 about an axis extending along the contact 820. In this way, the arrester 802 can be arranged or rotated to vent gases in a suitably safe direction during a failure.

The arrester body 834 includes a pull device 840 positioned opposite the insertion portion 804. The arrester body 834 also includes an elongated enclosure 842 extending from the insertion portion 804. Like the elongated enclosure 637, the elongated enclosure 842 houses the electronics of the arrester 802.

Figure 9A:
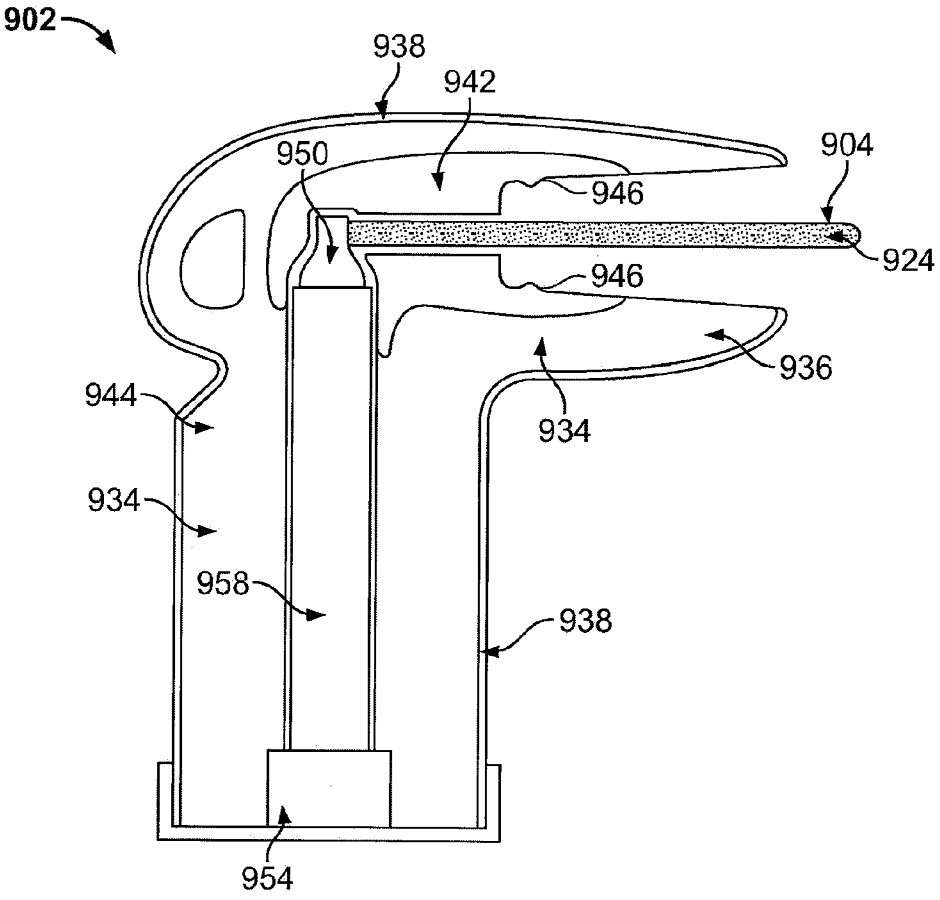
FIG. 9A is a side cross sectional view of an arrester for insertion into an injection port of an electrical device.
Figure 9B:
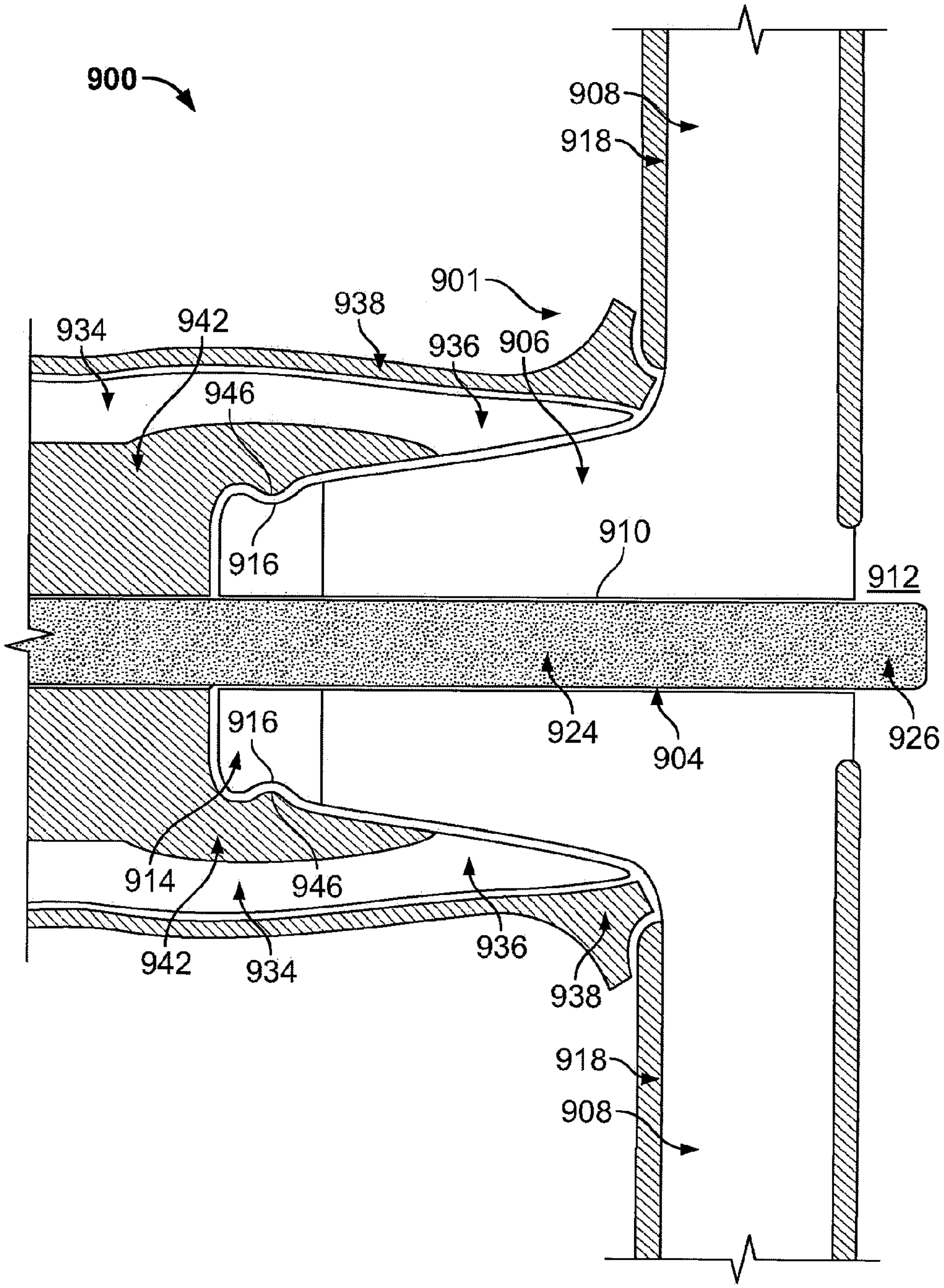
FIG. 9B is a side cross sectional view of an insertion portion of the arrester of FIG. 9A inserted into an injection port of an electrical device.

Referring also to FIGS. 9A and 9B, in another implementation, an electrical device is designed with an access region 900 and a surge arrester 902 is designed with an insertion portion 904 that is configured to be inserted into the access region 900. Unlike the access region 415, the access region 900 lacks a sleeve and a cover. Unlike the insertion portion 600, the insertion portion 904 lacks a contact cover 620 and includes a cup region 936 extending from a body 934 of the arrester 902 and designed to cover a projection 906 of the access region 900 when the arrester 902 is connected to the electrical device, as detailed below.

The projection 906 extends from a body 908 of the electrical device. The projection 906 defines a cavity 910 that provides access to an interior 912 of the electrical device. The projection 906 also includes an end region 914 having a recess 916 formed along an outer surface of the end region 914. The projection 906 is made of an insulative material such as insulative rubber or plastic and the end region 914 can be made of an insulative or conductive material. In either case, the end region 914 is attached to the projection 906.

The electrical device includes a region 901 that is reconfigured to accommodate the design of the access region 900. In particular, the region 901 includes an external conductive shell 918 surrounding the body 908. Unlike the conductive shell 420, the conductive shell 918 does not extend over the projection 906. Therefore, the projection 906 is exposed if the arrester 902 is not attached to the electrical device.

The insertion portion 904 includes an arrester contact 924 having a region 926 that extends into the interior 912 and electrically contacts the conductor 410 when the arrester 902 is attached to the electrical device. The arrester contact 924 is made of any suitably conductive metal. The contact 924 is sized to intimately mate with and slide into the cavity 910.

The arrester 902 includes the arrester body 934 that includes the cup region 936 that fits over the projection 906. The arrester body 934 and the cup region 936 are formed of an insulative material such as insulation rubber. The arrester body 934 and the cup region 936 are surrounded by a layer 938 of conductive material or a conductive coating bonded to its exterior surface. That is, the conductive material is fixedly adhered to the exterior surface of the arrester body 934 and the cup region 936 such that it is intended to remain on the exterior surface indefinitely and is not readily removable. The conductive material may be sprayed on the exterior surface of the arrester body 934 and cup region 936 or it may be deposited by any suitable process, such as, for example, painting or metalizing. The layer 938 may be made of a conductive rubber.

The arrester 902 also includes a semiconductive insert 942 surrounding the contact 924 and at least a portion of the internal electronics within an elongated enclosure 944. The semiconductive insert 942 includes a ridge 946 that is formed on an inner surface of the insert 942 such that the ridge 946 mates with the recess 916 of the end region 914 and the semiconductive insert 942 fits over the end region 914 and a portion of the projection 906 when the arrester 902 is attached to the electrical device. The ridge 946 and the recess 916 are cylindrical such that the arrester 902 can be rotated relative to the access region 900 about an axis extending along the contact 924. In this way, the arrester 902 can be arranged or rotated to vent gases in a suitably safe direction during a failure.

The internal electronics of the arrester 902 includes a terminal 950 electrically connected to the contact 924, a terminal 954 electrically connected a ground potential through a ground lead, and an array 958 of other electrical components that form a series electrical path between the terminals 950 and 954.

Figure 10:
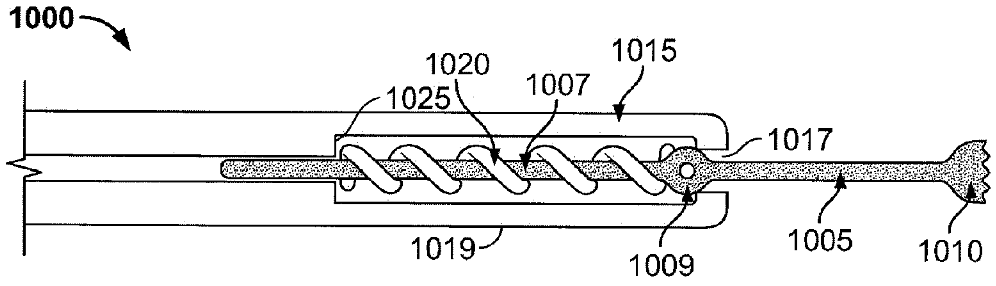
FIG. 10 is a side cross sectional view of an insertion portion of an arrester that can be inserted into an injection port of the electrical device of FIGS. 4, 5, 7, 8B, or 9B.

Referring to FIG. 10, in another implementation, the arrester may be designed with an insertion portion 1000 configured to be inserted into the cavity of the electrical device. The insertion portion 1000 includes an arrester contact 1005 and a contact cover 1015 that surrounds a region 1007 of the contact 1005 and defines an opening 1017 through which the contact 1005 moves. The cover 1015 has an outer surface 1019 sized to be inserted into the cavity of the projection while still maintaining an intimate fit with the wall of the projection forming the cavity to keep air within the electrical system shielded from partial discharge.

The contact 1005 includes a region 1010 that extends into the interior of the electrical device and electrically contacts the conductor when the arrester is attached to the electrical device. The arrester contact 1005 also includes an enlarged region 1009 having a cross section that is larger than the cross section of the opening 1017 of the cover 1015 to prevent the arrester contact 1005 from extending too far out of the contact cover 1015. The arrester contact 1005 is made of any suitably conductive metal. The contact cover 1015 may be made of a conductive material or an insulative material, depending on the construction of the access region and the arrester.

The insertion portion 1000 includes a biasing device such as a spring 1020 that biases the contact 1005 (at the enlarged region 1009) against an inner wall 1025 of the cover 1015. The spring 1020 electrically connects the contact 1005 to the cover 1015. In this way, when the arrester is attached to the electrical device, the region 1010 of the contact 1005 contacts the conductor 410 and is biased by the spring 1020 to maintain contact with the conductor 410 until the arrester is detached from the electrical device.

Other implementations are within the scope of the following claims.

What is claimed is:

1. An electrical device comprising:

an insulating body;

an electrical contact having a first end for electrically coupling to an electrical apparatus and a second end within the insulating body;

a conductor electrically coupled to the second end of the electrical contact and extending at least partially through the insulating body;

a projection extending from the insulating body, the projection defining a cavity that provides access to an interior of the electrical device and to the conductor; and a surge arrester external to the insulating body, attached to the projection, and being electrically coupled to the conductor through the cavity.

2. The electrical device of claim 1 wherein the surge arrester electrically couples to the conductor so as to divert over voltage induced cuffent surges within the conductor around the electrical apparatus.

3. The electrical device of claim 1 further comprising a shell surrounding the body.

4. The electrical device of claim 3 wherein the shell is made of a conductive elastomeric material.

5. The electrical device of claim 1 wherein the projection is made of an insulative material.

6. The electrical device of claim 1 further comprising a projection cover surrounding the projection.

7. The electrical device of claim 6 further comprising a shell surrounding the body and electrically coupled to the projection cover.

8. The electrical device of claim 6 further comprising a shell surrounding the body and electrically decoupled from the projection cover.

9. The electrical device of claim 6 wherein the projection cover is made of a conductive elastomeric material.

10. The electrical device of claim 6 further comprising a sleeve surrounding the projection cover.

11. The electrical device of claim 10 wherein the surge arrester includes a ridge that mates with a recess formed into the sleeve.

12. The electrical device of claim 6 wherein the projection cover is integral with a body of the surge arrester.

13. The electrical device of claim 6 wherein the surge arrester includes a ridge that mates with a recess formed into the projection cover.

14. The electrical device of claim 1 wherein the surge arrester includes a cup region that fits over the projection.

15. The electrical device of claim 14 wherein the cup region includes a ridge that mates with a recess formed into the projection.

16. The electrical device of claim 1 wherein the surge arrester includes an arrester contact that extends through the cavity and electrically couples with the conductor.

17. The electrical device of claim 16 wherein the surge arrester includes a contact cover that surrounds at least a portion of the arrester contact.

18. The electrical device of claim 17 wherein the contact cover has an outer surface that intimately slides through the cavity.

19. The electrical device of claim 17 wherein the contact cover is made of an insulative material.

20. The electrical device of claim 17 wherein the surge arrester includes a biasing device within the contact cover and surrounding the portion of the arrester contact to bias the arrester contact toward the conductor.

21. The electrical device of claim 16 wherein the arrester contact is made of a conductive material.

22. The electrical device of claim 1 wherein the insulating body extends along a first direction and a second direction that is distinct from the first direction.

23. The electrical device of claim 22 wherein the electrical contact extends along the first direction.

24. The electrical device of claim 22 wherein the conductor extends along the second direction from the second end of the electrical contact.

25. An electrical device comprising:

a body that extends along a first direction and a second direction that is distinct from the first direction;

an electrical contact arm extending along the first direction and including an electrical contact having a first end for electrically coupling to an electrical apparatus and a second end within the body;

a conductor arm extending along the second direction and including a conductor being electrically coupled to the second end of the electrical contact;

a projection extending from the body and from the conductor arm along a direction that is distinct from the second direction, the projection defining a cavity that provides access to an interior of the electrical device and to the conductor; and a surge arrester attached to the projection, and being electrically coupled to the conductor through the cavity.

26. The electrical device of claim 25 wherein the body is made of an insulative material.

27. The electrical device of claim 25 further comprising a conductive shell surrounding the body.

28. The electrical device of claim 25 wherein the projection is made of an insulative material.

29. The electrical device of claim 25 wherein the surge arrester includes an arrester contact that extends through the cavity and electrically couples with the conductor.

* * * * *